Jan. 29, 1963  C. L. COFFEE  3,075,315
RACK FOR STORING AND TRANSPORTING FISHING LINES
Filed Feb. 16, 1961
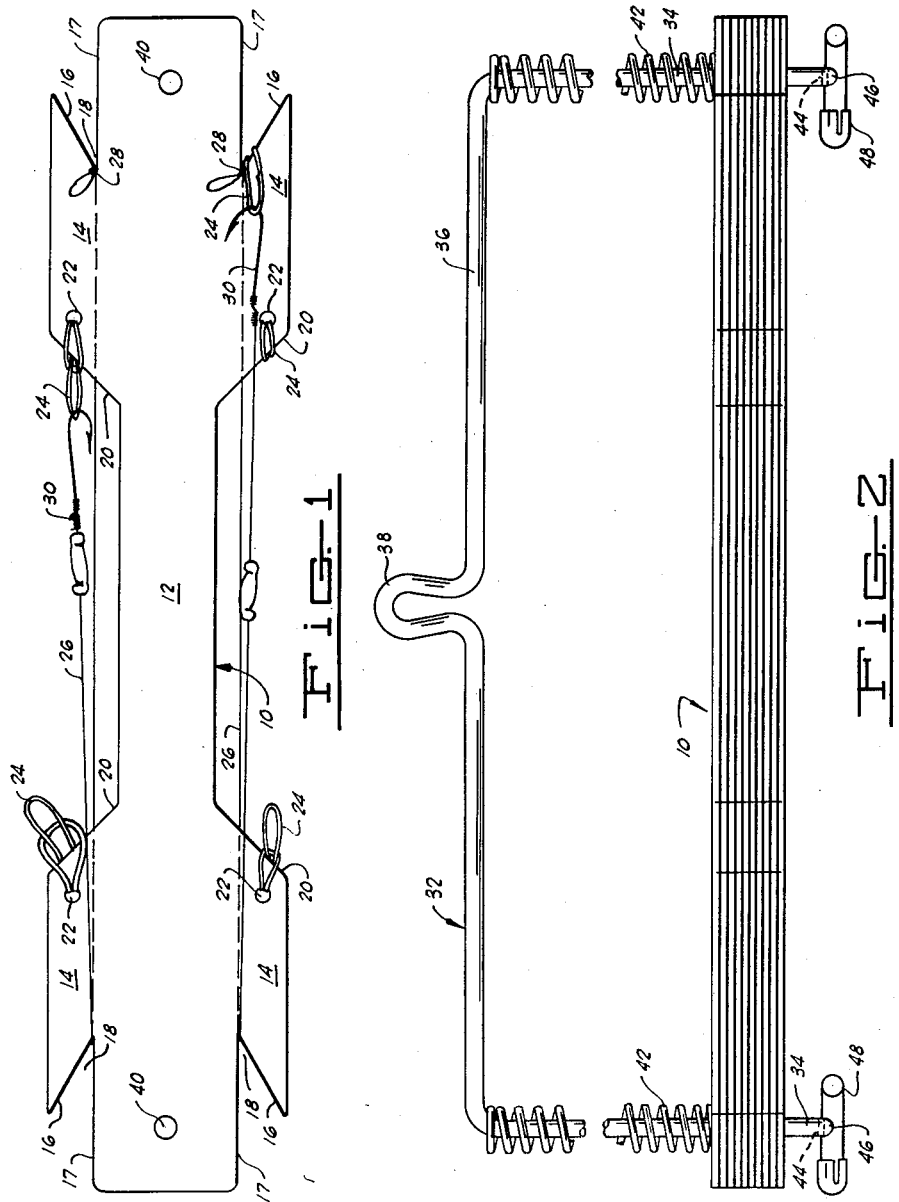
INVENTOR.
CLARENCE L. COFFEE
BY
ATTORNEYS

United States Patent Office 3,075,315
Patented Jan. 29, 1963

3,075,315
RACK FOR STORING AND TRANSPORTING
FISHING LINES
Clarence L. Coffee, 505 SE. 45th St.,
Oklahoma City, Okla.
Filed Feb. 16, 1961, Ser. No. 89,869
1 Claim. (Cl. 43—54.5)

This invention relates to a device for storing and carrying fishing lines having a hook at one end thereof. More particularly, but not by way of limitation, the present invention relates to a device for storing and carrying fishing lines of varying lengths and varying thicknesses in a manner which allows the fishing lines to be subjected to aeration during storage and to be maintained in a taut condition during such storage.

All fishermen are acquainted with the problem of storing fishing lines in a neat and orderly fashion for transportation to and from the location of the fishing operation. There are several aspects of the problem which may confront the fisherman under certain circumstances, and anyone who fishes frequently is probably familiar with each of these aspects from his own experience.

Perhaps the most frequently encountered need in storing fishing lines when they are not in actual use is the need to maintain the lines in an orderly, untangled state so that they may be quickly and easily rigged out for use in fishing. The further problem exists of storing the lines in a manner which will allow them to be quickly dried by freely circulating air in order to prevent rotting and deterioration due to moisture and dampness. Finally, the lines should be maintained in a taut condition in order to preserve their strength and to prevent kinking or dislocation from the rack or device upon which they are stored.

In the past, a number of storage devices have been utilized which, in varying degrees, overcome one or more of the problems which have been cited. In practically every instance, the storage of the lines is effected by securing one end in a fixed position upon a member of some type, and then wrapping the line around the member in an orderly fashion until the end of the line bearing the hook is reached. The hook is then secured in some manner at a second position upon the device. Such devices, which may be generally termed storage and carrying racks, have, however, previously offered only limited solutions to the problems which have been described. That such devices have not satisfactorily met the needs of fishermen is evidenced by the fact that many fishermen still utilize only a chunk of wood or some other readily available piece of material as a support upon which to wrap the fishing lines for storage purposes.

In some of the previously devised fishing line storage racks with which applicant is familiar, the racks provide satisfactory storage only for fishing lines of the type which are termed "snelled" lines. Such snelled lines are generally of relatively short length and act only as intermediate leaders for connecting the fishing hooks to the main portion of the fishing lines. The carriers which have been devised for storing such lines make no provision for the storage of very long fishing lines, or for storing lines of differing lengths in that the snelled lines are simply secured by one of their ends to one end of an elongated member and are then attached at their other end to the other end of such member. Such storage racks are therefore entirely unsuitable for the storage of elongated lines which exceed the length of the carrier rack and which are of greater thickness than the usual horse-hair leaders utilized in snelled lines. Such racks are particularly unsatisfactory for use in storing heavy lines of the type used in bank line, trotline and drop line fishing.

In other types of storage and carrying racks which have previously been devised, the devices, while accommodating lines of greater length, do not make provision for the storage of lines of differing lengths. Thus, unless the particular line which is being stored upon such racks happens to be of the precise length required to reach to and engage the hook securing portion of the rack, slack is allowed to exist in such lines resulting in the problems attributable to slack which have been discussed above.

In yet other types of fishing line storage and carrying devices which have previously been devised, the lines, when in place upon the rack, bear against the surface of the rack and are not exposed to freely circulating air so that such lines remain damp or wet for long periods of time and consequently undergo rapid deterioration and rotting.

It has also been perceived by applicant that a common disadvantage of many of the previously devised fishing line storage devices is their ungainly size and bulk which prevents their being placed in and carried in a fishing tackle box or similar device utilized by fishermen for transporting their tackle to the fishing area.

The present invention comprises a fishing line storage and carrying device which is of simple and inexpensive construction, yet which enables a fisherman to store a number of fishing lines of practically any thickness or length in an orderly and taut condition, during which storage the lines are constantly subjected on all sides to freely circulating air. The construction of the device is such that the length of the line which is stored thereon is immaterial, resilient hook engaging means being utilized to engage the hook at one end of the line and bias the line to a taut condition regardless of its length.

The device of the invention may be said to consist of two major parts, a flat, elongated plate upon which a plurality of fishing lines of varying length and thickness may be stored in a taut and untangled condition, and a U-shaped storage rack upon which a plurality of such plates may be stored in superimposed relation so that any number of the plates may be readily removed from the storage rack when it is desired to utilize the fishing lines carried by the plates. Both the individual plates and the storage rack with the plates located thereon are small enough in size to facilitate their carriage within a fishing tackle box.

It is, accordingly, an object of the present invention to provide a device of inexpensive and simple construction for storing and carrying fishing lines of varying lengths and thicknesses.

A further object of the present invention is to provide a fishing line storage and carrying device, the construction of which permits such fishing lines to be stored thereon in a taut condition.

An additional object of the present invention is to allow fishing lines to be stored upon a rack in a manner which permits them to be sufficiently aerated to prevent rotting and deterioration.

A further object of the present invention is to provide a fishing line storage and carrying rack upon which fishing lines may be quickly and easily stored or released from storage when they are to be utilized for fishing.

Other objects and advantages of the present invention will become manifest when the following disclosure is read in conjunction with a perusal of the accompanying drawings which illustrate my invention.

In the drawings:

FIGURE 1 is a plan view of one of the storage plates utilized for storing a plurality of fishing lines of any size in a taut and orderly condition.

FIGURE 2 is a view in elevation of the U-shaped storage and carrying rack of the present invention with a number of the plates shown in FIG. 1 stored thereon.

Referring now to the drawings in detail, and particularly to FIG. 1, reference character 10 designates generally an elongated, flat metallic plate upon which fishing lines of varying lengths may be stored. The plate 10 is arrow-shaped at its opposite ends and may be said to be comprised of a central shaft portion 12 having parallelogram-shaped feather portions 14 on each side of the shaft 12 at each end. The trailing edges 16 of the feather portions define with the longitudinal edges 17 of the shaft 12 V-shaped slots 18. It will be noted that the longitudinal edges of the medial portion of shaft portion 12 are offset inwardly from a line extending between the slots 18 so that a large portion of the fishing lines stored upon the plate will be exposed to freely circulating air without interference by the plate 10. Adjacent the leading edge 20 of each of the feather portions 14, an aperture 22 extends through the feather portion to facilitate the securement thereto of a suitable resilient member for engaging the hooks at one end of the lines.

In the preferred embodiment of the invention illustrated in FIG. 1, rubber bands 24 are passed through the apertures 22 and secured to each of the feather portions 14 with a bight of the band extending toward the opposite end of the plate 10. In order to secure a fishing line 26 of any length or any thickness to the plate 10 it is only necessary to form a knot 28 in the free end of the fishing line and wedge the knot into the V-shaped slot 18 formed between the feather portion 14 and the shaft 12 at one end of the plate 10. The line is then extended to the other end of the plate 10 and passed through the slot 18 located on the same side of the shaft 12 as the slot 18 retaining the knot 28 in one end of the line. The fishing line 26 is then wrapped a number of times around the plate 10 by passing it through the slots 18 until the end of the line bearing the hook 30 is positioned intermediate the ends of the plate 10. The hook 30 is then engaged by the rubber band 24 located at the leading edge 20 of the feather portion 14 nearest the hook. The elastic nature of the rubber band 24 will assure that the line 26 is maintained under tension at all times. In the event that the hook 30 is positioned toward the center of a feather portion 14 after the line has been wound upon the plate 10, the rubber band 24 may be passed through the nearest adjacent slot 18 and then engaged with the hook 30 so that the line may be placed under tension. One of the lines 26 upon the plate 10 illustrated in FIG. 1 is secured in this manner.

In FIG. 2 the rack for storing the plates 10 is depicted. The U-shaped storage and carrying rack is designated generally by reference character 32 and is characterized by a pair of parallel leg portions 34, a bight portion 36 interconnecting the parallel leg portions 34, and a handle 38. As shown in FIG. 1, each of the plates 10 is provided with a circular aperture 40 adjacent each end of the shaft 12 so that the leg portion 34 of the U-shaped storage and carrying rack may be passed through these apertures in mounting the plates upon the storage and carrying rack. The leg portions 34 are of sufficient length to receive a number of the plates 10 in superimposed relation. A pair of helical springs 42 or other suitable resilient members are placed around the legs 34 and abut against the bight portion 36 of the storage and carrying rack so that the plates 10 are constantly biased downwardly toward the free ends 46 of the leg portions 34. A pair of apertures 44 are formed adjacent the free ends 46 of each of the leg portions 34 for the accommodation of suitable retaining means such as a screw or cotter key for retaining the storage plates in position. In the simple embodiment of the invention illustrated in FIG. 2, a pair of safety pins 48 have been passed through the apertures 44 and serve to retain the storage plates 10 upon the rack 32.

From the foregoing description, it will be perceived that the present invention provides a very simple and inexpensive device for storing and carrying fishing lines. The lines which may be mounted upon the device may be of any length, since one of the resilient members or rubber bands 24 will always be in position to engage the hooked end of the line and place the line under tension. The thickness of the lines is also immaterial since the V-shaped slots 18 can accommodate all thicknesses of fishing lines normally encountered. Thus, trotlines, bank lines and drop lines all may be stored upon the plates 10. Moreover, each of the plates 10 can accommodate a number of the fishing lines. When a plurality of the plates are stored upon the U-shaped storage and carrying rack 32, the entire assembly may be carried within a conventional fishing tackle box. As soon as one of the plates 10 is removed from the storage and carrying rack 32, the plate next adjacent the free ends 46 of the leg portions 34 of the rack is moved downwardly into position adjacent the retaining means ready for immediate removal and use. When the lines are stored upon the storage plates 10, the medial portions of the line are exposed to freely circulating air so that they are soon dried. It should be noted also that the same advantage is realized when the plates are stored upon the U-shaped storage and carrying rack 32, since the medial portions of all of the lines are exposed to the free flow of air without interference by the shaft portions of any of the several superimposed plates.

A number of innovations and modifications in the structure and arrangement of the elements of the storage and carrying device of the present invention will occur to those skilled in the art. Insofar as such innovations and modifications fall within the scope of the appended claims, it is my intention that they be considered a part of the present invention.

I claim:

A device for storing and carrying fishing lines comprising a plurality of elongated flat plates, each having at one end thereof a notch dimensioned to retain a knot in one end of each of said fishing lines, said plates each further having an aperture therethrough adjacent each of its ends; resilient hook engaging means secured to each of said plates adjacent each of their ends; a generally U-shaped rack having a pair of parallel legs passing through said apertures; means cooperating with said legs adjacent their free ends to prevent said plates from being inadvertently removed from said U-shaped rack; and resilient means on said rack for biasing said plates into contact with said preventing means.

References Cited in the file of this patent

UNITED STATES PATENTS

| | | |
|---|---|---|
| 2,130,112 | Woolen | Sept. 13, 1938 |
| 2,573,431 | Gibson | Oct. 30, 1951 |
| 2,574,908 | Buicke | Nov. 13, 1951 |
| 2,663,114 | Warner | Dec. 22, 1953 |
| 2,749,654 | Harris | June 12, 1956 |
| 2,846,806 | Gaines | Aug. 12, 1958 |